United States Patent [19]

Meinders

[11] Patent Number: 5,313,817
[45] Date of Patent: May 24, 1994

[54] WHEELABLE, STORABLE COOLER

[76] Inventor: Larry L. Meinders, 1406 Sussex Dr., Ocean Springs, Miss. 39564

[21] Appl. No.: 59,113

[22] Filed: May 7, 1993

[51] Int. Cl.⁵ ............................................... F25D 3/08
[52] U.S. Cl. ................................ 62/457.1; 62/457.7; 280/43.24; 280/43.1; 280/64; 190/18 A
[58] Field of Search ...................... 62/457.1, 457.7, 371; 280/47.17, 47.26, 43.24, 47.24, 64, 43.1; 190/18 A, 115

[56] References Cited

U.S. PATENT DOCUMENTS

| | | | |
|---|---|---|---|
| 4,846,493 | 7/1989 | Mason | 280/43.1 |
| 5,249,438 | 10/1993 | Rhaney et al. | 62/457.7 |

*Primary Examiner*—John M. Sollecito
*Attorney, Agent, or Firm*—Joseph E. Root

[57] ABSTRACT

A wheelable cooler includes a cooler body and a pair of wheelgear assemblies. The cooler body is generally boxlike in form, and the wheelgear assemblies include a U-shaped handle, with extension arms extending from a crossbar. The wheelgear assemblies also include fender assemblies, each including a fender body that carries a wheel. A mounting member extends from the fender body at a selected angle, with a handle extension arm is slidably carried in each mounting member. The handle is movable between a retracted position in which the extension arms are inserted into the mounting members, and an extended position in which the extension arms are only partially inserted into the mounting members. Detent assemblies lock the extension arms in the retracted and extended positions. A support rod joins the fender assemblies, extending through each fender assembly and carrying the cooler body. Finally, latch assemblies are carried on the cooler body for engaging the extension arms and maintaining the same in the extended position.

7 Claims, 3 Drawing Sheets

WHEELABLE, STORABLE COOLER

BACKGROUND OF THE INVENTION

This invention relates generally to the field of recreational equipment, and more particularly to the field of articles useful for conveying cold food and beverage items.

The portable cooler has become a virtual fixture for a variety of activities, including picnics, camping, fishing, or visits to the beach or backyard cookouts. Some of the fun of such activities is tempered, however, by the requirement to carry a loaded cooler long distances. Coolers can hold a goodly volume of ice, food and beverages, and that load can present a serious problem when one is forced to negotiate the long distance between a parking lot and the beach, for example.

While enhanced mobility is needed, however, it should be borne in mind that the cooler must also be convenient to transport, stable when stationary, and easy to carry. Departures from the convenience standards set by existing coolers will not be welcomed by the market.

The prior art has attempted to provide a useful wheeled cooler, but those attempts have yet to win public acceptance. Efforts to date have proven too complicated, too clumsy, or just not workable. For example, the technically interesting device shown in U.S. Pat. No. 4,932,677, (Shustack, Jun. 12, 1990), features a tracked device that appears unwieldy and complex. In contrast, the cooler disclosed in U.S. Pat. No. 4,724,681 (Bartholomew, Feb. 16, 1988), requires that the cooler be oriented in a particular posture for carrying, and the wheel configuration provides little to no ground clearance. The "Portable Cooler" of U.S. Pat. No. 4,873,841 (Bradshaw, Oct. 17, 1989) presents the opposite problem, with large, permanently fixed wheels that impede storage and hand carrying. Similarly, neither the "Beach Hand Cart" of U.S. Pat. No. 4,618,157 (Resnick, Oct. 21, 1986) or the "Mobile Cooler Chest and Cooler Chest Support" of U.S. Pat. No. 4,976,448 (Wickersham, Dec. 11, 1990) is a self-contained unit lending itself to easy storage or hand carrying.

What is required is a mobile cooler that can be carried and stored with the same ease as a conventional cooler, with the ability to convert quickly to a wheelable mode in which a user can easily propel the cooler forward. Such a device is the subject of the present invention.

SUMMARY OF THE INVENTION

The broad object of the present invention is to provide a chest-type cooler that can conveniently be converted between a carrying mode, in which it is able to be carried with the same ease as is experienced with a conventional cooler, and a wheelable mode, in which the cooler is easily moved over a variety of terrain on a pair of wheels.

A further object of the invention is the provision of a wheelable cooler that can be stored in about the same volume as is required for conventional coolers.

Yet another object of the invention is to provide a wheelable cooler that can be stacked with other coolers for transportation or storage.

These and other objects are achieved in the present invention of a wheelable cooler, which generally includes a cooler body and a pair of wheelgear assemblies. The cooler body is generally boxlike in form, having side walls, end walls, a bottom wall and a lid. Other conventional accessories, such as carrying handles and a drain, may be added as desired. The wheelgear assemblies include a handle, generally U-shaped in form, with coplanar, generally parallel extension arms extending from a crossbar. Other parts of the wheelgear assemblies include a pair of wheels and a pair of fender assemblies, each including a fender body adapted to accept one of the wheels. A mounting member extends from the fender body at a selected angle, adapted to accept a handle extension arm. Each extension arm is slidably carried in a mounting member, with the extension arms movable between a retracted position in which the extension arms are substantially fully inserted into the mounting members, and an extended position in which the extension arms are only partially inserted into the mounting members. The fender assemblies also have detent assemblies for locking the extension arms in the retracted and extended positions. A support pivot aperture extends through the fender assembly at a point between the wheels and the extendable handle, at the juncture between the fender body and the mounting member, and a support rod joins the fender assemblies, extending through each fender assembly support pivot aperture and carrying the cooler body. Finally, latch assemblies are carried on the cooler body for engaging the extension arms and maintaining the same in the extended position.

DETAILED DESCRIPTION OF A PREFERRED EMBODIMENT

Figure 1:
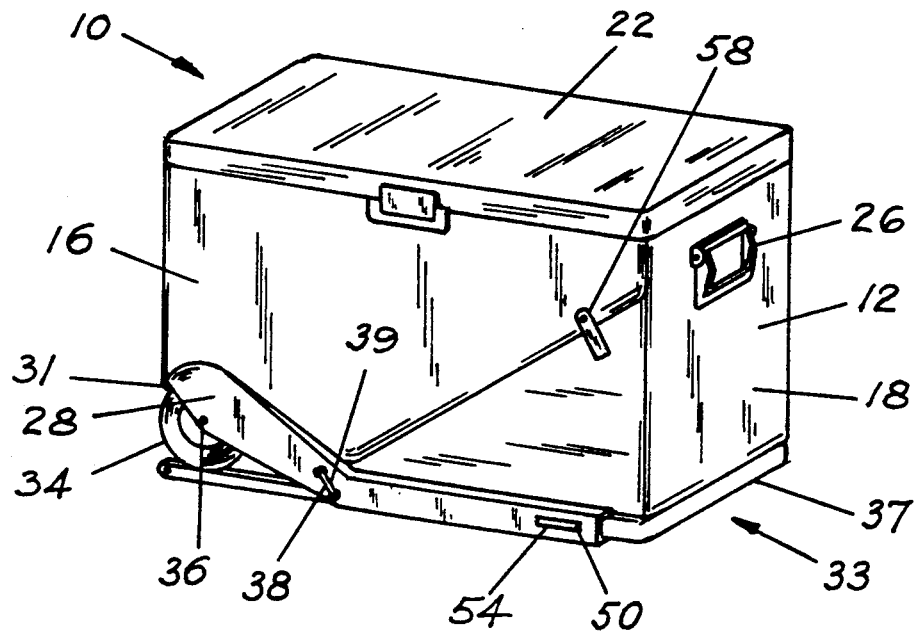
FIG. 1 is a pictorial depicting a preferred embodiment of the invention.
Figure 2:
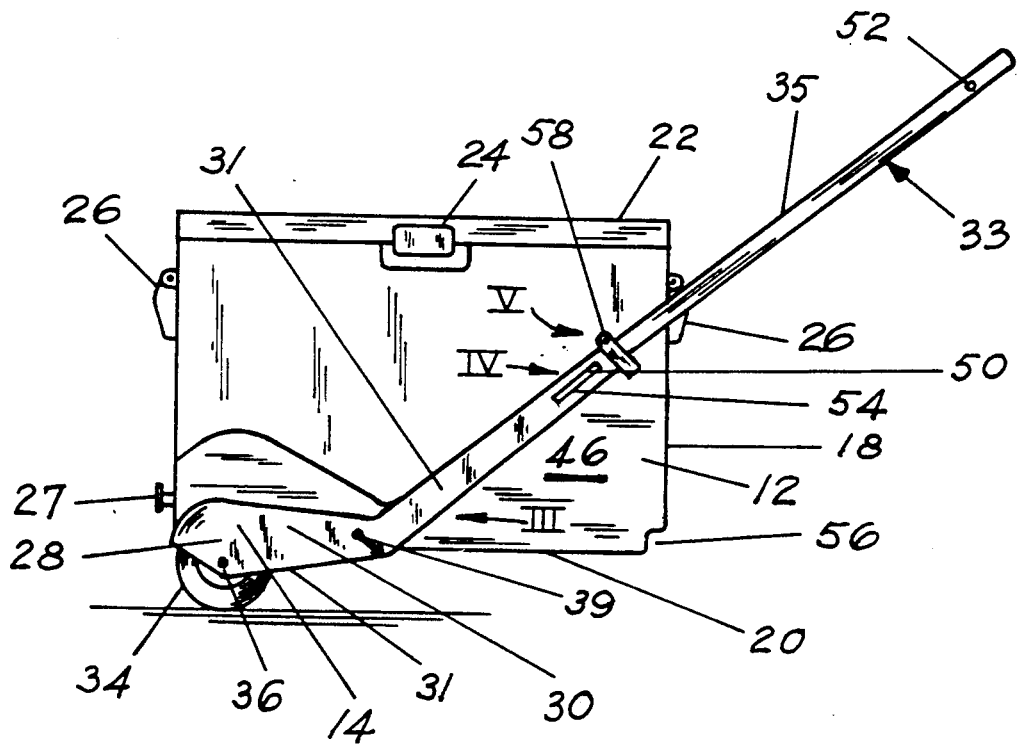
FIG. 2 is a front elevation of the embodiment shown in FIG. 1.

A wheelable cooler 10 according to the present invention is shown in FIGS. 1 and 2. As seen there, the invention includes two major assemblies—a cooler body 12 and a wheelgear assembly 14. The function and structure of the Wheelgear assembly will be covered in detail below, but it should be understood from the outset that this grouping can assume two positions, the stationary configuration of FIG. 1, and the wheelable configuration of FIG. 2.

The cooler body is similar to a conventional cooler in many respects, retaining the perceived advantages of such devices. This portion of the invention can assume a number of shapes and attributes, but it is preferred to fabricate the cooler body in a form familiar to most consumers, with a unitary body having side walls 16, end walls 18 and a bottom wall 20, with a lid 22 atop the unit, hinged on one side and fastenable with a latch 24 on the other side. The walls and lid are manufactured preferably from thermoplastic or metallic materials, with foam insulation to prevent heat loss. The structure and materials of the cooler body itself are entirely conventional and known to the art. Lifting handles 26 may be attached to each end wall, again as known in the art, and a drain 27 can be provided on an end wall.

The wheelgear assembly 14 allows the unit to become mobile, notwithstanding large loads of ice, food and beverages. Generally, this assembly includes a pair of fender assemblies 28, each shaped somewhat like a pork chop, with a relatively short, fat fender body 30 and a relatively long tapering mounting member 32 extending from the fender body at a shallow angle. A U-shaped extendable handle 33 joins the two fender assemblies, with extension arms 35 slidably carried in each mounting member and a crossbar 37 forming the base of the U. This handle is preferably fabricated from aluminum tubing, as is conventionally seen in lawn and garden machinery and tools.

Figure 4:
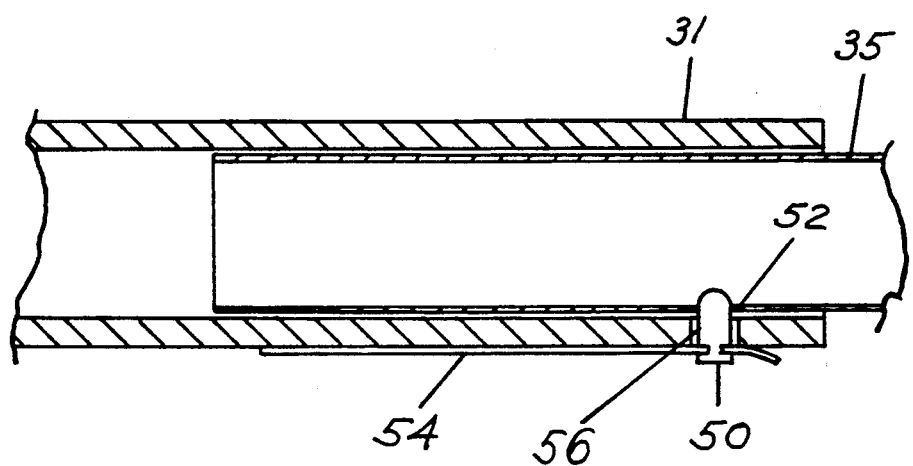
FIG. 4 is a detail view of area IV shown in FIG. 2.

To implement the stationary and wheelable modes noted above, the handle moves between a stowed position shown in FIG. 1, in which the handle is slid into the mounting members as far as possible, and an extended position of FIG. 2, in which the handle is extended from the fender assembly for easy grasp by a user. The handle is stabilized in those two positions by the engagement of a locking apparatus, such as a detent 50, into one of two detent apertures 52 formed in each extension arm. As seen best in FIG. 4, the detent is carried on a detent leaf spring 54, which in turn is carried on the mounting member with the detent extending through a mounting aperture 56 in the mounting member. As is known in the art, this arrangement allows the user to slide the extension arm in and out at will, while providing secure retention of the detent during use. Of course, other conventional means can be used to accomplish this result. Operation of the extendable handle is detailed below.

The fender body 30 is preferably U-shaped in cross-section and defines a wheel well 31. A wheel 34 is carried within the wheel well, rotating on wheel axle 36. The wheel axle can be a rivet or other conventional fastener known to the art. Preferably the wheel well partially encloses the wheel, much like an old-fashioned aircraft landing gear. This design minimizes the contact between the wheel and a user when the cooler is being carried, which in turn minimizes the dirt and grime transferred to the user's clothes or body from the wheel.

It is preferred that both the fender body and the wheel be constructed from plastic materials known to the art for such applications. Dimensioning likewise falls well within the skill of those in the art, with the caveat that the wheels should be as wide as possible, given constraints of cost and the like, taken together with requirements to interface with the cooler body as discussed below. Additional wheel width will allow the unit to traverse more rugged terrain with greater ease.

As noted above, the fender body forms a shallow angle with the mounting member. That angle is important in both the stationary and wheelable cooler configurations, as made clear below. The particular angle for a given cooler design is chosen based on the overall size of the unit, as will be understood by those in the art.

Figure 3:
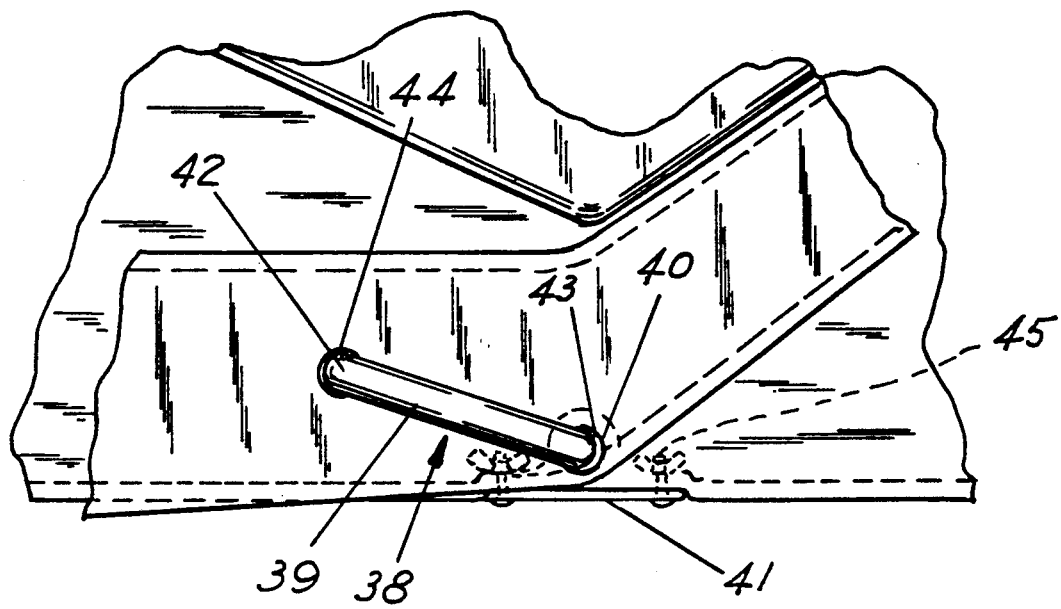
FIG. 3 is a detail view of area III shown in FIG. 2.

One wheelgear assembly is carried on each side of the cooler body, with a support rod 38 extending between the two assemblies and spanning the bottom of the cooler. For ease of operation and enhanced stability it is preferred that a support rod channel 40 be formed in the cooler bottom to accept the support rod, and a channel cover 41, fastened to the cooler bottom by conventional means such as screws 45, prevents sand, dirt or debris from accumulating there, as shown in FIG. 3. Of course, the support rod could simply be secured in place on the cooler bottom, as by brackets, but the cooler would then not rest flat on a supporting surface.

The support rod can be a simple, straight piece of rod stock, but it has also been noted that improved performance can be gained by providing control extensions 39 (FIG. 3), formed by a ninety-degree bend in each end of the rod, with further bends forming hooks 42 at each end of the rod. A support pivot aperture 43 and hook aperture 44 are formed in each fender body, the former preferably located at the intersection of the fender body and the mounting member, extending completely through the fender body, and the latter offset a distance toward the wheel axle and extending only partially through the fender body. The support rod extends through the support pivot aperture of each fender body, and the hook is engaged in the hook aperture. Positioning each hook aperture in mirror-image locations on the fender body and bending the support rod so that the control extensions lie in the same plane imparts improved stability to the wheel assemblies and insures that they pivot in unison, as set out in more detail below. It is also important that the support pivot aperture be located as close to the apex of the angle defined by the fender body and the mounting arm, to increase the loading effect noted below.

In order to provide optimum storage and handling characteristics, it is preferred that the lower portion of each side wall be recessed to accommodate the wheelgear assembly, so that the wheelgear does not protrude beyond the sides of the cooler body. The resulting wheelgear well 46 is dimensioned to allow the wheelgear assembly to move between extended and retracted positions, as discussed below. The wheelgear well is thus formed by molding or forming the lower portion of the cooler body as a recessed area having a depth at least equal to the thickness of the wheelgear assembly. The area will generally take the form of abutting zones, roughly triangular in shape and meeting at the point where the support rod spans the cooler body. These zones are dimensioned to accommodate the areas swept by the fender body on one side and the mounting arm and extendable handle on the other side.

As noted above, the cooler of the present invention shifts between two operating modes, based on the disposition of the wheelgear assembly. In the stationary mode, the cooler is configured for either stationary duty (either while being stored, or during access to food and beverages carried within the cooler) or for manual transportation (by hand over rough terrain, such as soft sand or large rocks, or in a vehicle). This mode is shown in FIG. 1, and is characterized by the wheelgear assembly being in a retracted position. The stability of the cooler is enhanced by several design features of the invention. The wheelgear assembly is completely retracted, so that no portion extends beyond the envelope of the cooler side and end walls. That result is made possible by providing a handle well 56 in the cooler end wall 18 adjacent the extendable handle, into which the handle crossbar nests. Also, the angle defined by the fender body 30 and the mounting member 31 allows the handle extension arms to fit beneath the wheels 34. Thus, when the handle is pivoted down parallel to the cooler bottom and inserted into the mounting members, the detent engages the aperture at a point where the crossbar is nesting into the handle well, providing a secure and stationary configuration. Also, a lip can be molded into handle well 56, further locking the wheelgear assembly to the cooler body. Unlike previous wheeled coolers seen in the art, the cooler of the present invention rests on a completely flat bottom in the stationary mode, allowing safe transportation in a vehicle. Also, the completely retracted position of the wheelgear assembly facilitates carrying the cooler.

Figure 5:
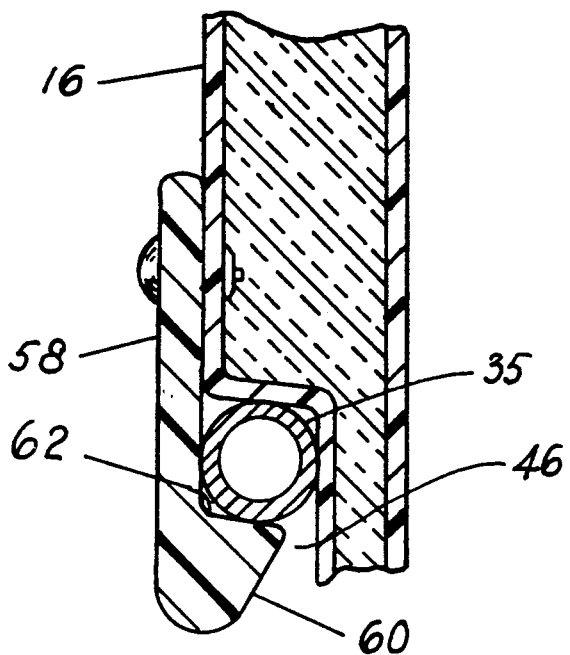
FIG. 5 is a detail cross-section of area V shown in FIG. 2.

The cooler is converted to the wheelable mode by extending the handle and lifting it upward, thus pivoting the fender body downward and extending the wheels beneath the level of the cooler bottom. This configuration is stabilized by locking the handle in position, using latches 58, as best seen in the detail cross section of FIG. 5. This element is preferably formed from thermoplastic or other suitable material and is attached to the cooler side wall by conventional means, such as a rivet or the like. A latch is positioned above each wheelgear well 46 to engage an extension arm 35. As is known in the art, the latch flexes to accept and release the extension arm, and includes a beveled engagement surface 60 for urging the latch outward by either the pressure of the extension arm or manually by a user, and a retention surface 62 for holding the extension arm in place. A number of other retention means will be apparent to those in the art, and may be substituted within the scope of the invention.

Figure 6:
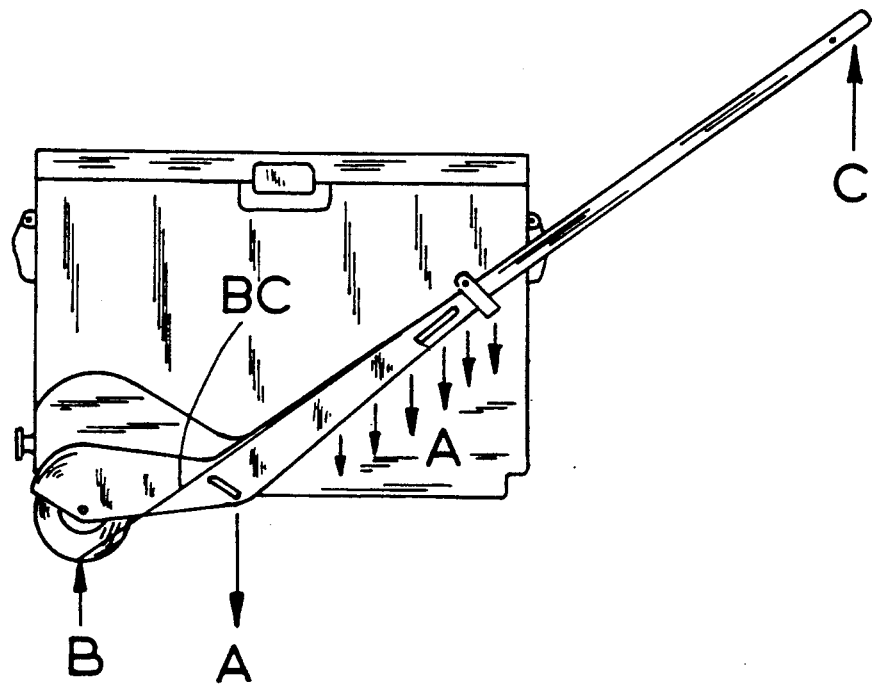
FIG. 6 is a schematic representation of the forces acting on the embodiment of FIG. 1.

The way in which the cooler body is supported by the wheelgear assembly contributes to both the ease of use and the stability of the present invention when in the wheelable mode. Analysis of the forces involved in the present invention shows that the load bearing members (here, the wheelgear assemblies) are subjected to three forces, as diagrammed in FIG. 6. The weight of the cooler is applied primarily through the support rod, but a portion of that force is transmitted by the latches or directly by the handle well walls where they may come into contact with the mounting members or extension arms. This set of forces is shown as downward-acting arrows A. Balancing those forces are the reactive force exerted by the ground or other surface, applied to the bottom of the wheels and shown as arrow B, and the upward force applied by the user to the handle crossbar, shown as arrow C. Of course, the forces represented by arrows A and B are applied in equal portion to each of the two wheelgear assemblies. Because the fender assembly is angled, with the pivot aperture lying at the apex of the angle, the downward-acting forces (arrows A) are all applied below a line BC connecting the points at which upward-acting forces (arrows B and C) are applied.

The stability of such a system depends on whether the distribution of forces acts to restore an equilibrium condition when that equilibrium is upset. In other words, when a stable system is tipped, the forces tend to right the unit, restoring equilibrium. An unstable system, on the other hand, responds to tipping by falling over completely. The present invention is a fully stable system because the downward-acting weight is applied at a point lying below a line joining the points at which the upward-acting forces are applied. As a result, if the cooler is tipped while being wheeled (by going over a rock, for example), the downward-acting forces themselves act to restore the system to a balanced condition. Contrast that to a system in which the weight is applied at a point above the line connecting upward forces, as in a wheelbarrow, for example. There, any tipping action acts to destabilize the system immediately, as is well known to anyone who has ever tried to navigate a loaded wheelbarrow over uneven ground.

Thus, the present invention not only provides increased ease of use, but it also offers improved stability, and thus enhanced safety, over the prior art.

Those in the art will recognize that changes, improvements and modifications can be made to the embodiment disclosed herein without departing from the spirit of the invention. For example, the materials employed in constructing a cooler according to this invention can be varied widely. Also, the latching means for securing the wheelgear assembly in the wheelable mode can be positioned in a variety of locations on the cooler body. These and other changes can be implemented within the scope of the present invention, which is defined solely by the claims appended hereto.

I claim:

1. A wheelable cooler, comprising:
    a cooler body, generally boxlike in form, having side walls, end walls, a bottom wall and a lid;
    wheelgear means for moving the cooler, including
        a pair of wheels;
        a handle, generally U-shaped in form, with coplanar, generally parallel extension arms extending from a crossbar;
        a pair of fender assemblies, each including
            a fender body adapted to accept one of said wheels;
            a mounting member extending from said fender body at a selected angle thereto, adapted to accept a said handle extension arm therein;
            wherein each said extension arm is slidably carried in a said mounting member, with said extension arms movable between a retracted position wherein said extension arms are substantially fully inserted into said mounting members, and an extended position in which said extension arms are only partially inserted into said mounting members;
            means for locking said extension arms in said retracted and extended positions; and
            a support pivot aperture extending through said fender assembly at a point between said wheels and said extendable handle, at the juncture between said fender body and said mounting member;
        a support rod joining said fender assemblies, extending through each said fender assembly support pivot aperture and carrying said cooler body;
        latch means carried on said cooler body for engaging said extension arms and maintaining the same in said extended position.

2. The wheelable cooler of claim 1, further comprising wheelgear wells formed in each said cooler body side wall, having a depth at least equal to the thickness of said fender assemblies and dimensioned to accept said fender assemblies in both said retracted and extended positions, such that said fender assemblies do not extend beyond said cooler body side walls.

3. The wheelable cooler of claim 1, further comprising a handle well formed in a said end wall of said cooler body, dimensioned to accept said handle crossbar in said retracted position, such that said handle crossbar does not extend beyond said cooler body end wall.

4. The wheelable cooler of claim 1, further comprising a support rod channel formed in said bottom of said cooler body, dimensioned to accept said support rod such that said support rod does not extend beyond said cooler bottom.

5. The wheelable cooler of claim 1, wherein said support rod includes control extensions formed at both ends thereof, said control extensions being coplanar and each defining an angle of about ninety degrees with said support rod, the ends of each said control extension being fixed to a said fender body.

6. The wheelable cooler of claim 1, wherein said locking means is a detent means, including
   a detent assembly, carried on said mounting arm and including a detent spring fixed to said mounting arm, a mounting aperture formed in said mounting arm adjacent said detent spring, and a detent carried on said detent spring and extending through said mounting aperture; and
   detent apertures formed in said extension arms, dimensioned to received said detent when said extension arm is in said retracted and extended positions.

7. A wheelable cooler, comprising:
   a cooler body, generally boxlike in form, having side walls, end walls, a bottom wall and a lid; wheelgear means for moving the cooler, including
   a pair of wheels;
   a handle, generally U-shaped in form, with coplanar, generally parallel extension arms extending from a crossbar;
   a pair of fender assemblies, each including
      a fender body adapted to accept one of said wheels;
      a mounting member extending from said fender body at a selected angle thereto, adapted to accept a said handle extension arm therein;
      wherein each said extension arm is slidably carried in a said mounting member, with said extension arms movable between a retracted position wherein said extension arms are substantially fully inserted into said mounting members, and an extended position in which said extension arms are only partially inserted into said mounting members;
      detent means for locking said extension arms in said retracted and extended positions, including
         a detent assembly, carried on said mounting arm and including a detent leaf spring fixed to said mounting arm, a mounting aperture formed in said mounting arm adjacent said detent spring, and a detent carried on said detent leaf spring and extending through said mounting aperture; and
         detent apertures formed in said extension arms, dimensioned to received said detent when said extension arm is in said retracted and extended positions; and
      a support pivot aperture extending through said fender assembly at a point between said wheels and said extendable handle, at the juncture between said fender body and said mounting member;
   a support rod joining said fender assemblies, extending through each said fender assembly support pivot aperture and carrying said cooler body, said support rod including control extensions formed at both ends thereof, said control extensions being coplanar and each defining an angle of about ninety degrees with said support rod, the ends of each said control extension being fixed to a said fender body;
   wherein said cooler body includes
      wheelgear wells formed in each said cooler body side wall, having a depth at least equal to the thickness of said fender assemblies and dimensioned to accept said fender assemblies in both said retracted and extended positions, such that said fender assemblies do not extend beyond said cooler body side walls;
      a handle well formed in a said end wall of said cooler body, dimensioned to accept said handle crossbar in said retracted position, such that said handle crossbar does not extend beyond said cooler body end wall; and
      a support rod channel formed in said bottom of said cooler body, dimensioned to accept said support rod such that said support rod does not extend beyond said cooler bottom;
   latch means carried on said cooler body adjacent a said wheelgear well, for engaging said extension arms and maintaining the same in said extended position.

* * * * *